F. C. BOSWEL.
Fountain.
No. 218,422. Patented Aug. 12, 1879.
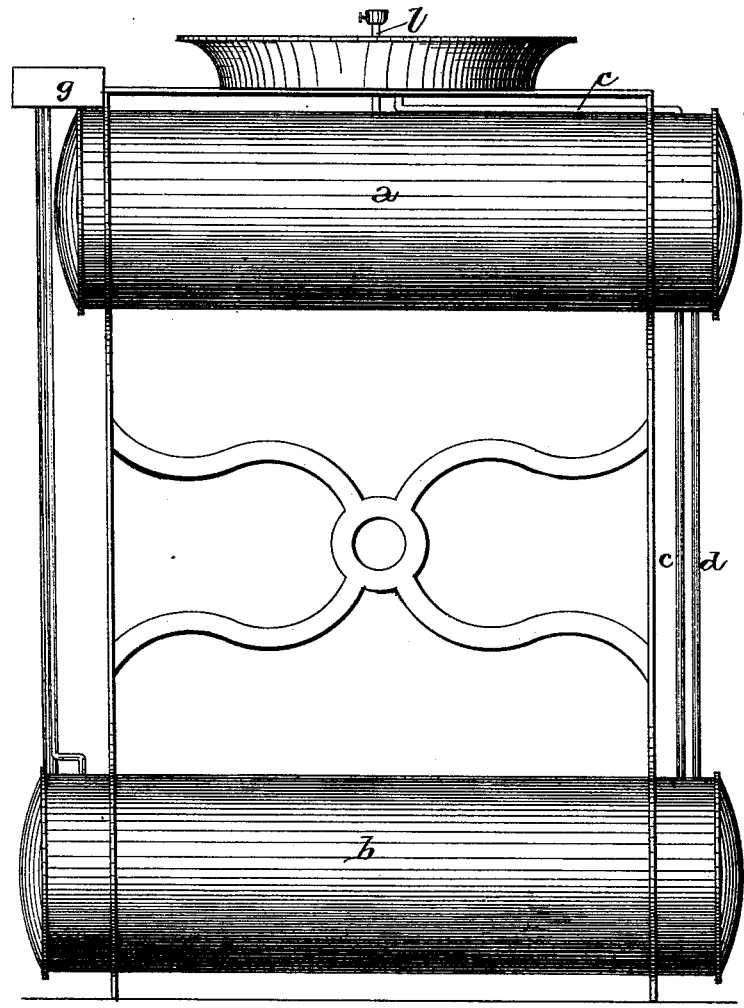
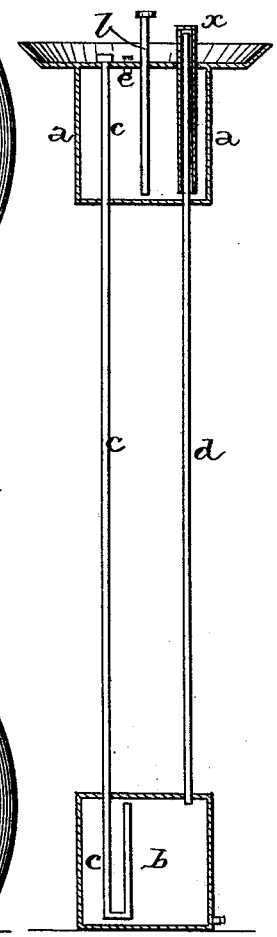
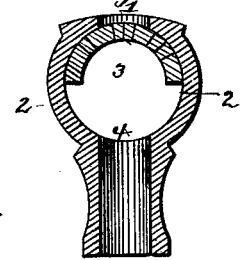
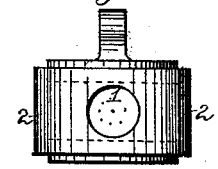
Witnesses:
J. W. Garner
H. S. D. Haines
Inventor:
F. C. Boswel,
per
F. A. Lehmann,
atty.

UNITED STATES PATENT OFFICE

FREDERICK C. BOSWEL, OF CLEAR SPRING, MARYLAND.

IMPROVEMENT IN FOUNTAINS.

Specification forming part of Letters Patent No. 218,422, dated August 12, 1879; application filed January 27, 1879.

*To all whom it may concern:*

Be it known that I, FREDERICK CHARLES BOSWEL, of Clear Spring, in the county of Washington and State of Maryland, have invented certain new and useful Improvements in Fountains; and I do hereby declare the following to be a full, clear, and exact description of the invention, such as will enable others skilled in the art to which it pertains to make and use it, reference being had to the accompanying drawings, which form part of this specification.

My invention relates to an improvement in fountains; and it consists in the arrangement and combination of parts that will be more fully described hereinafter, whereby an even, steady flow of water is kept up as long as there is any water in the upper tank.

Figure 1 represents a side elevation of a large fountain that is to be sunk into the ground. Fig. 2 is a vertical section of a parlor-fountain. Figs. 3, 4, and 5 are detail views.

*a b* represent the two water-tanks, separated from each other by a distance that is to be regulated by the height to which the water is to be thrown from the nozzle of the discharge-pipe, and these tanks are connected together by the water-pipe *c* and air-pipe *d*, and a suitable wooden or iron frame. These tanks and pipes will be made of galvanized sheet-iron or any other suitable metal.

The water-pipe *c* has its upper end extending from the bottom of the basin down into the lower tank; but instead of having its lower end simply pass down to the bottom of the lower tank, the end, after reaching the bottom, is bent upon itself, so that it reaches to the top again, whereby the water will always be discharged at or near the highest part of the tank. When this bend is not used there will be a sort of cup or vessel attached to the lower end of the pipe just after it passes through the top of the lower tank, and into which the water will first flow after leaving the pipe, so as to first fill the cup before running into the tank. This bend in the pipe and the cup both answer as seals for the lower end of the pipe, and permit the water to be discharged in the very top of the tank without any air escaping up through the pipe. By thus having the water discharged into the lower tank only at its highest point, together with the bend in the exit air-pipe *d*, described below, the pressure of water in the pipe will always be the same, whether there is much or little water in the tank *b*, and thus will cause a steady pressure of air in the upper tank, whereby the stream of water will always be thrown to the same height from the nozzle.

The upper end of the air-pipe passes either up through the bottom of the upper tank, up above the top thereof, and then bends downward upon itself to the bottom of the tank, or else bends up over the top of the tank, and, passing down through the top, reaches to the bottom thereof. It is necessary that this pipe should reach above the top of the tank; for if it does not, and the bend is made inside, as soon as the upper tank is filled the pipe will act as a siphon and let the water run down into the lower tank, and thus there will be none to be thrown from the nozzle.

By thus allowing the air to escape from the pipe only at the bottom of the upper tank the resistance to the air will remain the same, no matter how high the water stands. In most fountains the stream will be thrown highest at first, and will gradually die away to nothing, and this is one of the defects that my invention overcomes. By the peculiar construction above described the stream is thrown to the same height all the time, and when it stops it stops suddenly and altogether.

In the parlor-fountains there will be a pipe, *e*, leading from the basin into the top tank, and through which the tank is filled; but in those larger fountains which are intended for yards and lawns, this tank need not be, and is not, filled from the basin in that manner.

In the yard and lawn fountains, which are to be sunk into the earth, and in which the tanks are made large and arranged horizontally, there is placed a covered box, *g*, at one end of the upper tank, and in this box are arranged the air-valves *i o*, one for each tank, and the two pipes *n r*, one for each tank. A pump being applied to the pipe connected with the lower tank, and its air-valve being opened, the upper tank can be quickly filled by the water which has run down into the lower tank while the fountain was in operation, and thus the same water can be used again and again. By opening the pipe and air-valve connected with the upper tank, in first priming the fountain, the upper tank can be filled from any suitable source. The air-valves are connected with both tanks, so there will be no trouble in either filling or emptying them. Were it not for the air-valve in connection with the lower tank, the attempt to pump out the water would only form a vacuum, and thus the water could not be pumped. Of course, in proportion to the amount of water forced through the nozzle on the pipe $l$, the fountain will play longer or shorter. In order to regulate this a peculiar valve is used. The nozzle has a hole, 1, made through its top for the water to pass through, and a large horizontal hole, 2, through its side, to receive the hollow rotating valve 3. Through one side of this valve is made a slot, 4, which runs around the rim of the valve, and through the balance of the rim are made small groups of holes, each one increasing the number of its holes from one end to the other. By turning the valve so that one group will be brought under the hole 1, a certain number of small streams will pass through, and by turning it back or forward a larger or a smaller number of streams will be brought into play, as may be desired. Instead of groups of holes, there may be a number of single holes of different sizes. The valve should fit in its casing with sufficient tightness to prevent leaking.

Where the bend is not made in the air-pipe a long tube, $x$, having its upper end closed and extending some distance above the top of the tank, and its lower end reaching down to near the bottom of the tank, is placed over the top of the air-pipe, as shown in Fig. 2.

Having thus described my invention, I claim—

1. In a fountain, the water-pipe $c$, made to discharge its water only at the highest portion of the tank $b$, and having its end sealed, so that no air can pass through it, as shown.

2. The air-pipe $d$, having its upper end passed above the top of the tank $a$, and then bent upon itself, so as to discharge the air only at the bottom of the tank, as described.

3. In a fountain, the combination of the two tanks $a$ $b$ and the pipes $c$ $d$, the pipes being arranged so as to discharge the water in the top of the lower tank and the air in the bottom of the upper one, as specified.

In testimony that I claim the foregoing I have hereunto set my hand this 20th day of January, 1879.

FREDERICK CHARLES BOSWEL.

Witnesses:
OTHO KELLER BOVEY,
ABRAHAM FASNACHT.